United States Patent
Thangamani et al.

(10) Patent No.: US 10,294,964 B2
(45) Date of Patent: May 21, 2019

(54) OFF-SHORE WIND TURBINE WITH A THERMAL CONDITIONING SYSTEM

(71) Applicant: Gamesa Innovation & Technology, S.L., Sarriguren (Navarra) (ES)

(72) Inventors: Arunvel Thangamani, Zamudio (ES); Partiphan Subramanian Muragaiyan, Zamudio (ES)

(73) Assignee: ADWEN OFFSHORE S. L., Zamudio (Bizkaia) (ES)

( * ) Notice: Subject to any disclaimer, the term of this patent is extended or adjusted under 35 U.S.C. 154(b) by 592 days.

(21) Appl. No.: 13/826,389

(22) Filed: Mar. 14, 2013

(65) Prior Publication Data

US 2013/0302150 A1    Nov. 14, 2013

(30) Foreign Application Priority Data

Mar. 14, 2012  (IN) .............................. 735/DEL/2012

(51) Int. Cl.
| | | |
|---|---|---|
| *F03D 9/37* | (2016.01) | |
| *F03D 9/41* | (2016.01) | |
| *F03D 13/25* | (2016.01) | |
| *F03D 80/60* | (2016.01) | |
| *F03D 80/80* | (2016.01) | |
| *F04D 29/58* | (2006.01) | |

(52) U.S. Cl.
CPC ........... *F04D 29/5833* (2013.01); *F03D 9/37* (2016.05); *F03D 9/41* (2016.05); *F03D 13/25* (2016.05); *F04D 29/5806* (2013.01); *F03D 80/60* (2016.05); *F03D 80/80* (2016.05); *F05B 2240/95* (2013.01); *F05B 2260/20* (2013.01); *F05B 2260/64* (2013.01); *Y02E 10/722* (2013.01); *Y02E 10/726* (2013.01)

(58) Field of Classification Search
CPC .......... F03D 1/00; F03D 9/00; F03D 9/37–41; F03D 13/25; F03D 80/60; F03D 80/80; Y02E 10/727; F04D 29/5806–5833; F04B 17/02
USPC .................. 290/43–44, 54–55; 415/178, 4.3; 236/44 C; 138/149, 148, 114
See application file for complete search history.

(56) References Cited

U.S. PATENT DOCUMENTS

| | | | | |
|---|---|---|---|---|
| 3,473,575 A | * | 10/1969 | Vogelsang | ............ F16L 59/143 138/114 |
| 4,287,245 A | * | 9/1981 | Kikuchi | ................ F16L 59/024 138/141 |
| 6,439,832 B1 | * | 8/2002 | Siegfriedsen | .......... B01D 45/04 415/121.2 |
| 6,530,137 B1 | * | 3/2003 | Dewimille | ............ B29C 47/021 138/119 |

(Continued)

*Primary Examiner* — Alexander B Comley
(74) *Attorney, Agent, or Firm* — Ladas & Parry LLP

(57) ABSTRACT

A thermal conditioning system for an off-shore wind turbine. The thermal conditioning system has an insulating structure that reduces the thermal losses by convection of treated air circulating through a duct inside the tower, from the base-level of the wind turbine to the nacelle structure. The treated air is supplied by an air-treatment system located at the base level of the wind turbine. In the insulating structure an insulating material of a greater thermal conductivity than the treated air is provided, and a plurality of voids is arranged between the insulating material so that air flow between the voids is prevented by the insulating material.

13 Claims, 5 Drawing Sheets

(56) References Cited

U.S. PATENT DOCUMENTS

| | | | | |
|---|---|---|---|---|
| 7,036,531 B2* | 5/2006 | Manini | ................ | F16L 59/065 |
| | | | | 138/149 |
| 2011/0133483 A1* | 6/2011 | Yoneda | ................ | F03D 80/60 |
| | | | | 290/1 B |
| 2012/0156053 A1* | 6/2012 | Stiesdal | ................ | F03D 11/00 |
| | | | | 416/93 R |

* cited by examiner

OFF-SHORE WIND TURBINE WITH A THERMAL CONDITIONING SYSTEM

BACKGROUND OF THE INVENTION

This invention generally relates to a thermal conditioning system for wind turbines and, more particularly, to a thermal conditioning system for off-shore wind turbines.

Wind turbines are devices that convert mechanical energy to electrical energy. A typical wind turbine includes a nacelle mounted on a tower housing a drive train for transmitting the rotation of a wind rotor to an electric generator through, usually, a gearbox, and other components such as a yaw drive which rotates the wind turbine, several controllers and a brake. The wind rotor comprises a rotor hub supporting a number of blades extending radially therefrom for capturing the kinetic energy of the wind and causing the driving train rotational motion.

Some components of the wind turbine, particularly the gearbox and the generator are coupled to heat exchangers.

Known thermal conditioning systems of on-shore wind turbines combine the use of ambient air to cool the nacelle with the installation of heat exchangers associated to particular wind turbine components.

In case of off-shore wind turbines, there is a need for the treatment of air supplied for the thermal conditioning of the nacelle, due to the moisture content and the salinity of sea air. These properties of sea air could affect the working conditions and life of the nacelle components and so air treatment is required. Due to the bulkiness of the air-treatment plant, it can be placed at the base-level of the wind turbine and the treated air can be pumped to the nacelle through a duct inside the tower.

Taking into account the high powers foreseen for off-shore wind turbines, the use of high power, big size, and heavy weight air-treatment plants seems necessary. The cost of these plants may be very high.

During the air transport from the base-level to the nacelle, there are thermal losses to its surroundings due to convection because of the different temperature of the treated air with respect to the temperature of the air inside the tower.

A conventional insulation of the duct would indeed reduce the thermal losses along the duct but the insulation costs may not compensate the energy savings.

BRIEF DESCRIPTION OF THE INVENTION

According to the present invention an insulating structure that reduces the thermal losses by convection of a treated air circulating through a duct inside the tower of an off-shore wind turbine, from the base-level to the nacelle structure for thermal conditioning purposes, is provided. The treated air is supplied by an air-treatment system located at the base level of the off-shore wind turbine. The insulating structure comprises insulating material of a greater thermal conductivity than the air and a plurality of voids arranged between insulating material so that air flow between said voids is prevented.

The input to said air-treatment system is ambient air and the output of said air-treatment system is treated air having a reduced level of moisture and salinity and a temperature set as a function of the temperature of the air inside the tower, according to the thermal conditioning needs of the nacelle structure.

The nacelle structure may comprise a nacelle lower structure arranged inside a top segment of the tower and a nacelle housing with the rotor, drive-train, generator mounted on top of the tower in communication with the nacelle lower structure. In this case, the treated air is provided to the nacelle lower structure.

Advantageously the insulating material is glass wool. Other suitable insulating materials are cotton wool, mineral wool, rock wool, perlite, fibreglass, calcium silicate, cellular glass, polyurethane foam, elastomeric foam, phenolic foam, polystyrene, polyisocyanurate or polyiso, polyurethane or cork In a first embodiment, said duct comprises an inner wall and an outer wall (preferably metal sheets) and the insulating structure comprises insulating panels distributed along the duct, occupying all the space between the inner wall and the outer wall, and voids between said insulating panels. Advantageously, the ratio between the total volume of the panels and the total volume of the insulating structure is comprised between 0.05-0.15.

In a second embodiment, said duct comprises an inner wall and an outer wall (preferably metal sheets) and the insulating structure comprises insulating panels distributed along the duct being alternatively in contact with the inner wall and with the outer wall, occupying at least half the space between the inner wall and the outer wall, and voids between said insulating panels. Advantageously, the ratio between the total volume of the panels and the total volume of the insulating structure is comprised between 0.60-0.50.

In a third embodiment, said duct comprises an inner wall and an outer wall (preferably metal sheets) and the insulating structure comprises contiguous insulating blocks along the duct with at least an internal void, occupying the whole space between the inner wall and the outer wall. Advantageously, the ratio between the total volume of the internal voids of said blocks and the total volume of the insulating structure is comprised between 0.25-0.40.

Other desirable features and advantages of said thermal conditioning system will become apparent from the subsequent detailed description of the invention and the appended claims, in relation with the enclosed drawings.

DETAILED DESCRIPTION OF THE INVENTION

Figure 1:
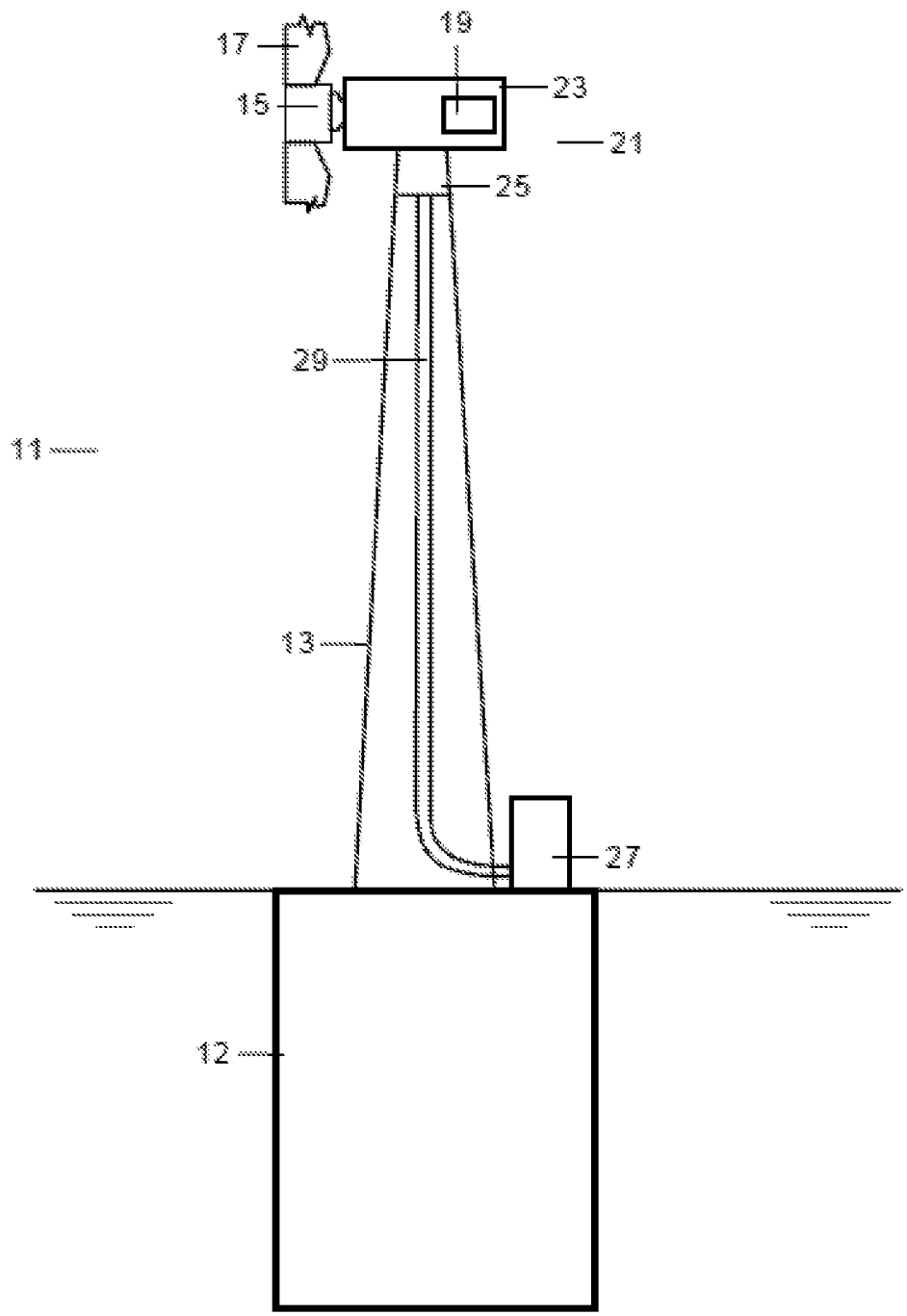
FIG. 1 is a schematic side view of a known off-shore wind turbine having an air-treatment plant at the base-level for supplying treated air to the nacelle for thermal conditioning purposes through a duct inside the tower.

FIG. 1 shows an off-shore wind turbine 11 comprising a foundation 12 and a tower 13 supporting a nacelle structure 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the wind turbine rotor to the generator 19 and to increase the shaft speed in order to achieve a suitable rotational speed of the generator rotor.

The nacelle structure 21 comprises a nacelle housing 23 where the main components of the wind turbine are located and a nacelle lower structure 25 where additional components are located.

The wind turbine also comprises an air-treatment plant 27 placed at the base-level for supplying treated air to the nacelle structure 21 through a duct 29. The input to the air-treatment plant 27 is ambient air. The output is treated air (with the required levels of moisture and salinity) at the desired temperature for the thermal conditioning needs of the nacelle structure 21.

In this description we will refer to an example where the temperature inside the tower is 25° and where a treated air flow of 4.4 Kg/s shall be supplied to the nacelle structure 21 at a temperature of 30° C.

In an off-shore wind turbine having a 65 m tower, the buoyant air inside the tower absorbs heat from the treated air that is passed from the air-treatment plant 27 to the nacelle structure 21 through the duct 29. The decrease of the temperature of the treated air in the nacelle structure 21 with respect to the temperature at the exit of the air-treatment plant 27 in a non-insulated duct 29 due to said thermal losses may be of 4-5° C.

The basic idea of the present invention is providing an insulating duct which reduces the thermal losses more efficiently than a conventional insulated duct by means of an insulating structure combining an insulating material such as glass wool and voids in a manner that the air trapped in said void spaces cannot flow from one void to another.

On the one hand, the combination of air (having a thermal conductivity of 0.024 W/mK) with glass wool (having a thermal conductivity of 0.04 W/mK) provides a better global thermal conductivity than an insulation with only glass wool.

On the other hand, the separation of the voids prevents thermal losses due to convection to the top of the tower. Otherwise, the height of the tower and the duct would induce those buoyant flows that are present when hot air is enclosed in a confined space because hotter air becomes lighter and moves upwards.

Figure 2A:
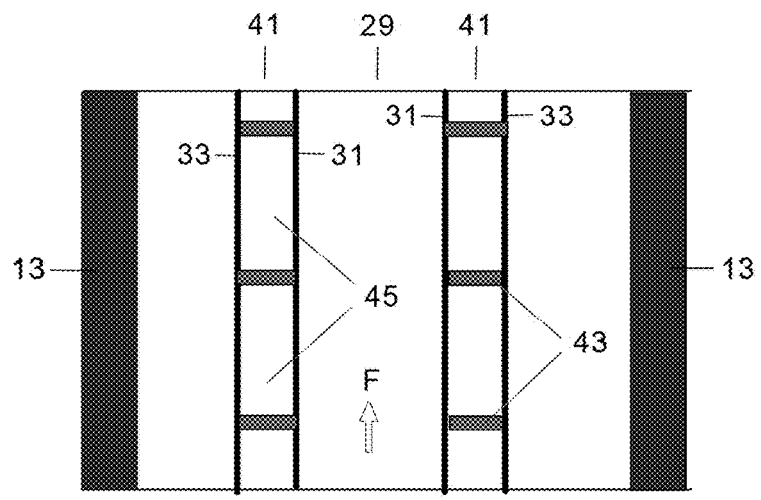
FIGS. 2a and 2b are respectively a side and a perspective view of an insulated duct according to a first embodiment of the present invention for supplying treated air to the nacelle of an off-shore wind turbine for thermal conditioning purposes.
Figure 2B:
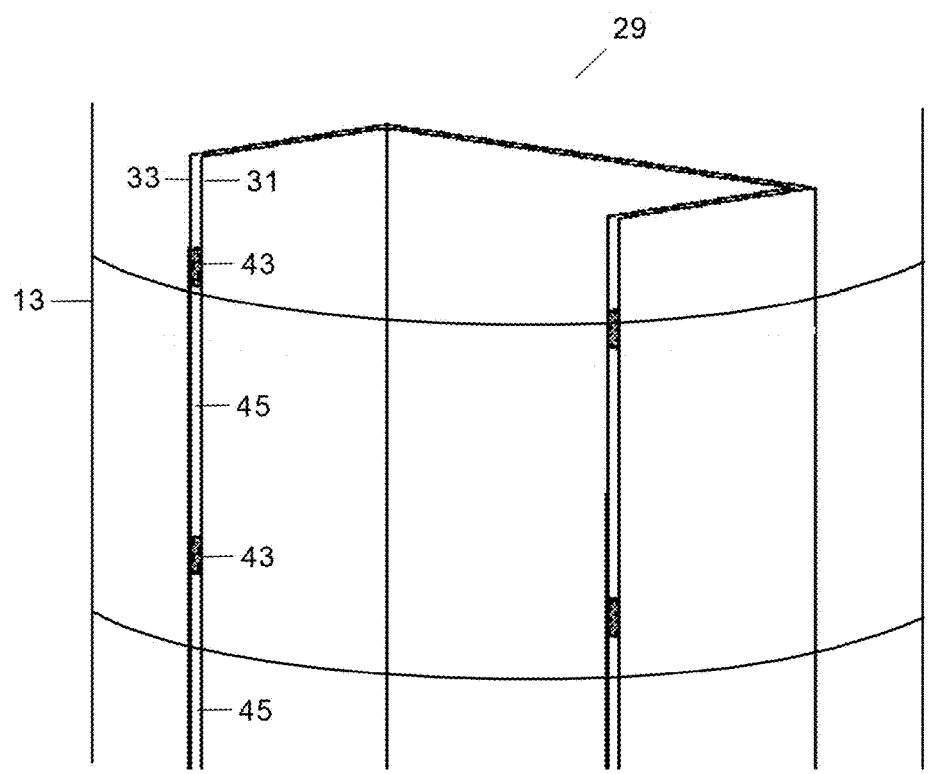

Other suitable insulating materials are cotton wool, mineral wool, rock wool, perlite, fibreglass, calcium silicate, cellular glass, polyurethane foam, elastomeric foam, phenolic foam, polystyrene, polyisocyanurate or polyiso, polyurethane or cork FIGS. 2a and 2b show a first embodiment of the invention where the duct 29 inside the tower 13, having a rectangular cross-section, comprises an inner wall 31, an outer wall 33 made of a metal sheet, preferably stainless steel, and an insulating structure 41 arranged between the inner wall 31 and the outer wall 33. The treated air flows in the direction indicated by arrow F. The insulating structure 41 is formed by a plurality of panels 43 of an insulating material such as glass wool, preferably equally spaced along the duct 29, leaving voids 45 between them.

In comparison with an insulating structure formed only with insulating material between the outer wall 31 and the inner wall 33, the insulating structure 41 shown in FIGS. 2a and 2b may achieve a reduction of between 40% and 55% of the thermal losses and a reduction of between 85% and 95% of the volume of the insulating material.

Figure 3A:
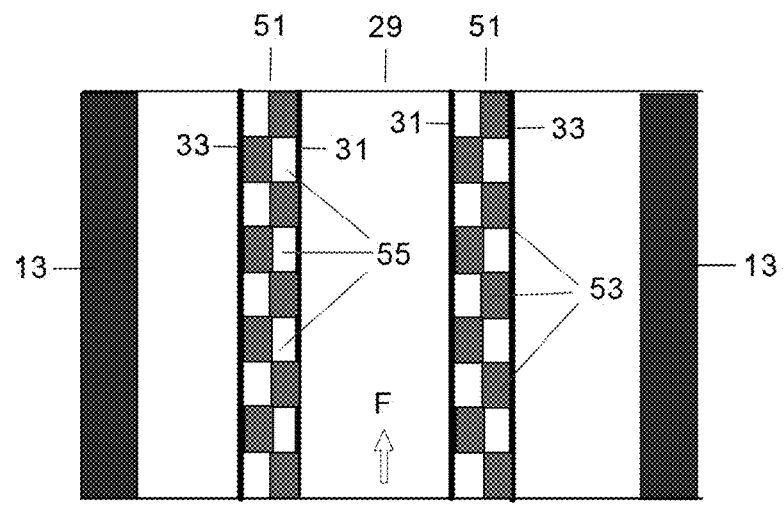
FIGS. 3a and 3b are respectively a side and a perspective view of an insulated duct according to a second embodiment of the present invention for supplying treated air to the nacelle of an off-shore wind turbine for thermal conditioning purposes.
Figure 3B:
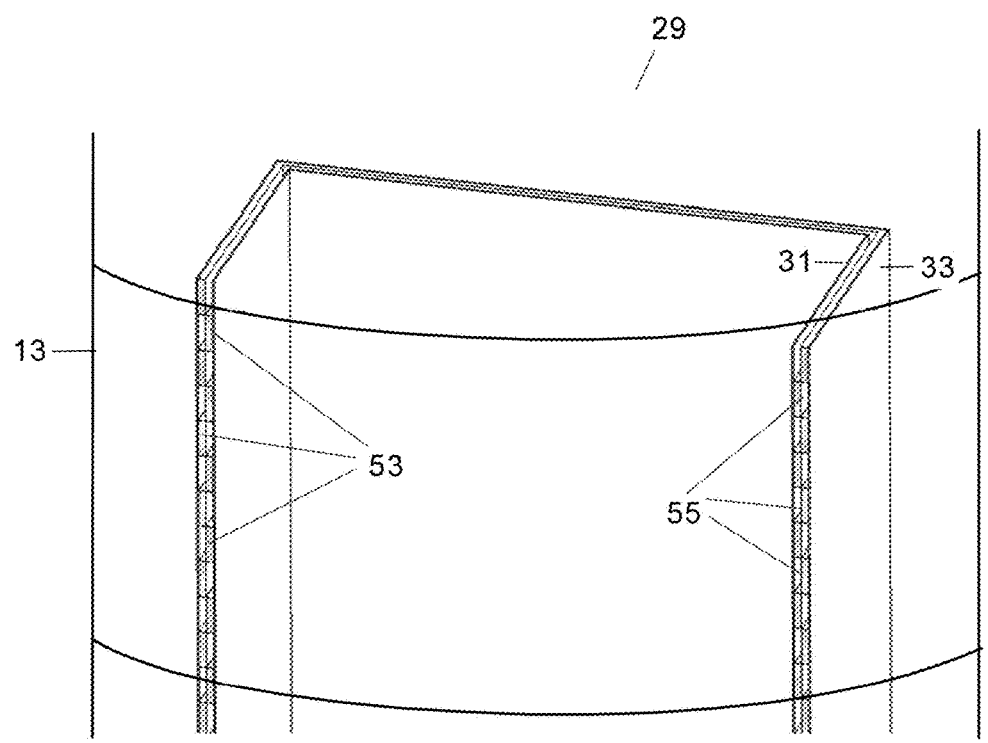

FIGS. 3a and 3b show a second embodiment of the invention where the duct 29 inside the tower 13, having a rectangular cross-section, comprises an inner wall 31, an outer wall 33 made of a metal sheet, preferably stainless steel, and an insulating structure 51 arranged between the inner wall 31 and the outer wall 33. The treated air flows in the direction indicated by arrow F. The insulating structure 51 is formed by a plurality of panels 53 of an insulating material such as glass wool, being alternatively in contact with the inner wall 31 and with the outer wall 33 occupying half the space between the inner wall 31 and the outer wall 31 leaving voids 55 between them.

In comparison with an insulating structure formed only with insulating material between the outer wall 31 and the inner wall 33, the insulating structure 51 shown in FIGS. 3a and 3b may achieve a reduction of approximately 30% of the thermal losses and a reduction of approximately 50% of the volume of insulating material.

Figure 4A:
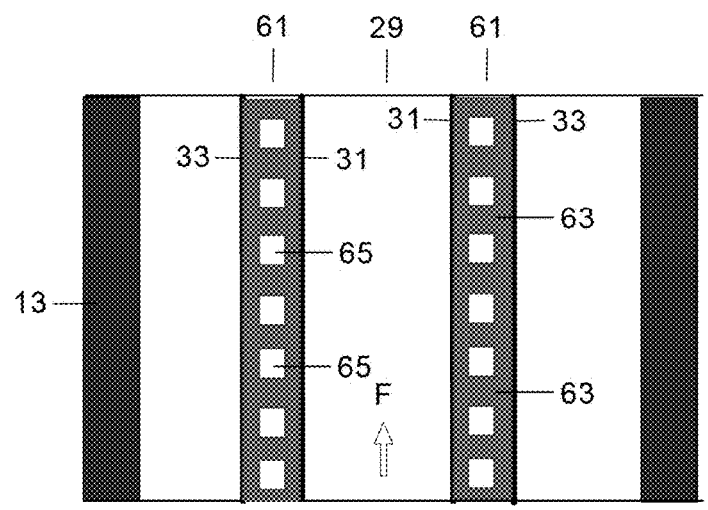
FIGS. 4a and 4b are respectively a side and a perspective view of an insulated duct according to a third embodiment of the present invention for supplying treated air to the nacelle of an off-shore wind turbine for thermal conditioning purposes.
Figure 4B:
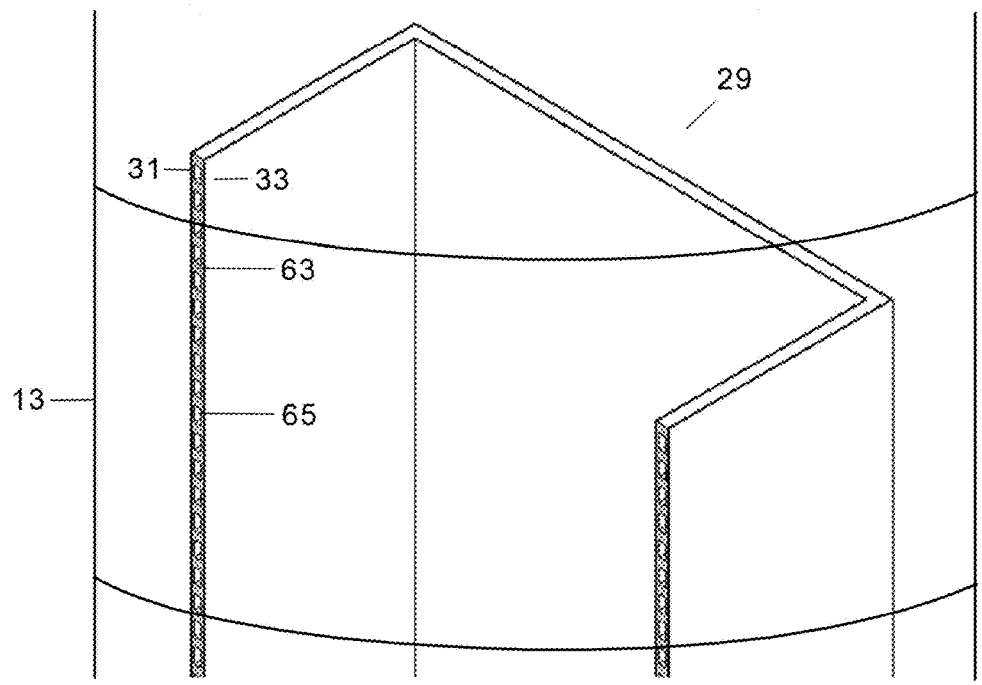

FIGS. 4a and 4b show a third embodiment of the invention where the duct 29 inside the tower 13, having a rectangular cross-section, comprises an inner wall 31, an outer wall 33 made of a metal sheet, preferably stainless steel, and an insulating structure 61 arranged between the inner wall 31 and the outer wall 33. The insulating structure 61 is formed by a plurality of contiguous insulating blocks 63 occupying the whole space between the inner wall 31 and the outer wall 33. Each insulating block has one or more internal voids 65.

In comparison with an insulating structure formed only with insulating material between the outer wall 31 and the inner wall 33, the insulating structure 61 shown in FIGS. 4a and 4b may achieve a reduction of approximately 25% of the thermal losses and a reduction of approximately 33% of the volume of insulating material.

Figure 5:
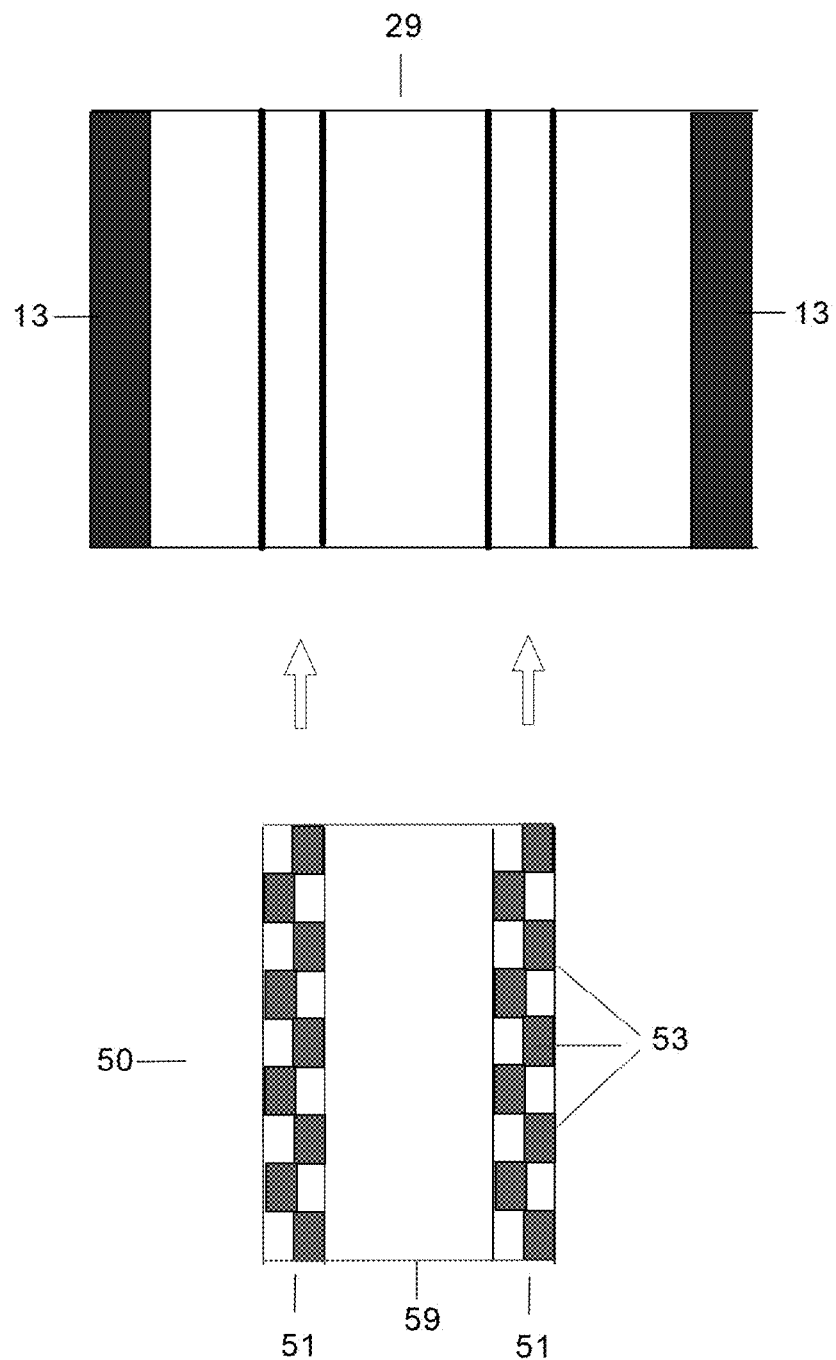
FIG. 5 shows schematically the installation of the insulating structure between the inner and outer walls of the duct in the second embodiment.

FIG. 5 illustrates a method for installing the insulating structure 51 in a duct 29 built in vertical sections.

Single units 50 of the insulating structure 51 for each section of the duct 29 are manufactured arranging the panels 43 inside a thin stiff wrapping 59 according to the above mentioned pattern.

The single units 50 are inserted between the inner wall 31 and the outer wall of the duct 20.

Similar methods can be used for the insulating structures 41 and 61 of the above-mentioned first and third embodiments of the invention.

The present invention therefore provides an insulating structure for a duct placed inside the tower for supplying treated air to the nacelle structure of an off-shore wind turbine which:

Reduces the insulating material cost.

Reduces the weight of the insulation structure.

Reduces the thermal losses due to o convection.

Can be installed easily between the inner and outer wall of the duct.

Requires a minimum amount of adhesive material.

Is not exposed to high loads and or pressures.

Although the present invention has been described in connection with various embodiments, it will be appreciated from the specification that various combinations of elements, variations or improvements therein may be made, and are within the scope of the invention.

The invention claimed is:

1. An air-treatment system of an off-shore wind turbine, having a tower having a base and a foundation; a wind rotor;

a nacelle structure mounted on said tower for housing wind turbine components; the air-treatment system providing thermally treated air provided by a thermal air-treatment plant located at the base of the tower to said nacelle structure for thermal conditioning purposes, the input to the air-treatment system being ambient air and the treated air having a reduced level of moisture and salinity and a temperature set as a function of the temperature of air inside the tower, according to thermal conditioning needs of said nacelle structure; said air-treatment system comprising:

a duct for conveying the thermally treated air from the thermal air-treatment plant to the nacelle structure, the duct comprising an inner wall, an outer wall, the inner and outer walls made of metal sheet and an insulating structure that reduces thermal losses by convection of the treated air when the thermally treated air circulates through said duct from the air-treatment plant said base to said nacelle structure, said insulating structure being arranged within a vertical space between said inner wall and said outer wall;

said insulating structure comprising insulating material of a greater thermal conductivity than the treated air and a plurality of voids arranged between insulating material, wherein said insulating structure is configured as insulating panels distributed along the duct, said insulating panels being alternately in contact with said inner wall and with said outer wall, each insulating panel occupying at least half of a horizontal portion of the vertical space between said inner wall and said outer wall of the duct; and wherein the voids are arranged between said insulating panels so that each of the voids is formed on three sides by three insulating panels and formed on a fourth side by one of said inner wall and said outer wall of said duct, in a manner that air trapped by said voids cannot flow from one void to another so that air flow between the voids is prevented by said insulating panels.

2. The air-treatment system of claim 1, wherein
said insulating panels have a total volume and said insulating structure has a total volume, said total volumes being related to each other by a ratio, and
the ratio between the total volume of said insulating panels and the total volume of said insulating structure is between 0.60-0.50.

3. The air-treatment system of claim 1, wherein:
the air-treatment system is configured to provide treated air to a nacelle lower structure arranged inside a top segment of said tower and a nacelle housing mounted atop said tower in communication with said nacelle lower structure.

4. The air-treatment system of claim 1, wherein the insulating material is glass wool.

5. The air-treatment system of claim 1, wherein the insulating material is selected from the group consisting of: cotton wool, mineral wool, rock wool, perlite, fiberglass, calcium silicate, cellular glass, polyurethane foam, elastomeric foam, phenolic foam, polystyrene, polyisocyanurate or polyiso, polyurethane, and cork.

6. The air-treatment system of claim 1, wherein said metal sheet is stainless steel.

7. The air-treatment system of claim 1, wherein said insulating structure is joined to said inner wall and to said outer wall by means of an adhesive.

8. An air-treatment system of an off-shore wind turbine having a tower having a base and a foundation; a wind rotor; a nacelle structure mounted on said tower for housing wind turbine components; the air-treatment system providing thermally treated air provided by a thermal air-treatment plant located at the base of the tower to said nacelle structure for thermal conditioning purposes, the input to the air-treatment system being ambient air and the treated air having a reduced level of moisture and salinity and a temperature set as a function of the temperature of air inside the tower, according to thermal conditioning needs of said nacelle structure; said air-treatment system comprising:

a duct for conveying the thermally treated air from the thermal air-treatment plant to the nacelle structure, the duct comprising an inner wall, an outer wall, the inner and outer walls made of metal sheet, and an insulating structure that reduces thermal losses by convection of the treated air when the thermally treated air circulates through said duct from the air-treatment plant said base to said nacelle structure, said insulating structure being arranged within a vertical space between said inner wall and said outer wall;

said insulating structure comprising insulating material of a greater thermal conductivity than the treated air and a plurality of internal voids arranged within said insulating material, wherein said insulating material is arranged in vertically contiguous insulating blocks each insulating block occupying a horizontal portion of the vertical space between the inner wall and the outer wall of the duct, such that each insulating block is in contact with the inner and the outer walls of the duct and with at least one other vertically contiguous insulating block, each insulating block comprising inner walls that completely enclose one of the internal voids, wherein said internal voids have a total volume and said insulating structure has a total volume, the total volumes being related to each other by a ratio, and the ratio between the total volume of the internal voids of said blocks and the total volume of the insulating structure is between 0.25-0.40; and wherein the internal voids are arranged in a manner that air trapped by said internal voids cannot flow from one void of one insulating block to another void of another insulating block.

9. The air-treatment system of claim 8, wherein:
the air-treatment system is configured to provide treated air to a nacelle lower structure arranged inside a top segment of said tower and a nacelle housing mounted atop said tower in communication with said nacelle lower structure.

10. The air-treatment system of claim 8, wherein the insulating material is glass wool.

11. The air-treatment system of claim 8, wherein the insulating material is selected from the group consisting of: cotton wool, mineral wool, rock wool, perlite, fiberglass, calcium silicate, cellular glass, polyurethane foam, elastomeric foam, phenolic foam, polystyrene, polyisocyanurate or polyiso, polyurethane, and cork.

12. The air-treatment system of claim 8, wherein said metal sheet is stainless steel.

13. The air-treatment system of claim 8, wherein said insulating structure is joined to said inner wall and to said outer wall by means of an adhesive.

* * * * *